United States Patent
Tani

(10) Patent No.: US 6,246,840 B1
(45) Date of Patent: Jun. 12, 2001

(54) LOCKING MECHANISM FOR BACKSIDE COVER OF CAMERA

(75) Inventor: Tetsuro Tani, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/444,519

(22) Filed: Nov. 22, 1999

(30) Foreign Application Priority Data

Nov. 24, 1998 (JP) ................................................ 10-332986

(51) Int. Cl.[7] .................................................... G03B 17/02
(52) U.S. Cl. ............................................................ 396/536
(58) Field of Search ...................................... 396/435, 535, 396/536, 537, 538

(56) References Cited

U.S. PATENT DOCUMENTS

| | | | |
|---|---|---|---|
| 3,358,574 | * 12/1967 | Liverano | 396/536 |
| 3,820,146 | * 6/1974 | Nesson et al. | 396/536 |
| 5,347,335 | * 9/1994 | Misawa | 396/536 |
| 5,708,856 | * 1/1998 | Cloutier | 396/536 |

* cited by examiner

Primary Examiner—David M. Gray
(74) Attorney, Agent, or Firm—Greenblum & Bernstein, P.L.C.

(57) ABSTRACT

A locking mechanism for a backside cover has an entrance hole which allows a lock pin to enter into a position where the lock pin is engaged with the hook part of the movable locking member when the backside cover is closed. A tapered surface is formed on one of the opposing surfaces of the entrance hole so that when the lock pin is forced in the biasing direction of the movable locking member, the tapered surface contacts with the lock pin to guide the lock pin in a direction in which the lock pin is discharged from the entrance hole.

7 Claims, 9 Drawing Sheets

PRIOR ART

LOCKING MECHANISM FOR BACKSIDE COVER OF CAMERA

BACKGROUND OF THE INVENTION

The present invention relates to a locking mechanism for a backside cover of a camera.

A locking mechanism for locking a backside cover in the closed state is provided for cameras. It is common that the locking mechanism comprises a fixed locking member on either one of a camera main body or a backside cover, and a movable locking member on the other one to be movable between the locking position for engagement with the fixed locking member and the unlocking position for disengagement therefrom. The movable locking member is biased toward the locking position in this kind of the locking mechanism. The movable locking member can be arranged to retract in the unlocking direction by contact with the fixed locking member during the course of closure of the backside cover. If the force for closing the backside cover is weak or insufficient, the fixed locking member may be sandwiched between the movable locking member and an adjacent member without establishing the complete engagement with the movable locking member, and held in that state due to the biasing force for the movable locking member. This incomplete closing of the backside cover looks as if the backside cover is closed, but actually the backside cover is not locked. This incomplete closing leads to problems that the backside cover is unintentionally opened during photographing to expose a film, and the backside cover is opened during the carriage of the camera to damage mechanisms inside the camera or the backside cover. Moreover, the incomplete closing of the backside cover is highly liable to malfunction the switch for electrically detecting the opening or closing of the backside cover.

SUMMARY OF THE INVENTION

An object of the present invention is to provide a locking mechanism for a backside cover of a camera, capable of preventing incomplete closure of the backside cover, with a simple and inexpensive arrangement.

A locking mechanism for a backside cover according to the invention has an entrance hole which allows a lock pin to enter into a position where the lock pin is engaged with the hook part of the movable locking member when the backside cover is closed. A tapered surface is formed on one of the opposing surfaces of the entrance hole so that when the lock pin is forced in the biasing direction of the movable locking member, the tapered surface contacts with the lock pin to guide the lock pin in a direction in which the lock pin is discharged from the entrance hole.

A locking mechanism for a backside cover according to a preferred embodiment comprises: a lock pin provided on one of the camera main body and the backside cover; a movable locking member supported by the other of the camera main body and the backside cover, the movable locking member being operable from an outside of the camera main body and movable between a locking position in which a hook part of the movable locking member is engaged with the lock pin in a state where the backside cover closes the back side of the camera main body, and an unlocking position in which the hook part is disengaged from the lock pin; a biasing mechanism which biases the movable locking member toward the locking position; an entrance hole formed on the one of the camera main body or the backside cover where the movable locking member is provided, the entrance hole allowing the lock pin to enter into an engagement position in which the locking pin is engaged with the hook part when the backside cover closes the back side of the camera main body; and a tapered surface provided in the entrance hole, wherein when the locking pin does not enter into the engagement position and is pressed in a biasing direction by the movable lock member, the tapered surface contacts with the lock pin and guides the lock pin externally from the entrance hole using a pressing force of the movable locking member.

In this arrangement configuration, since the lock pin is forced out from the entrance hole by the force acting on the movable locking member when the force of closing the backside cover is insufficient, there is no case that the backside cover is closed halfway without locking of the backside cover.

It is preferable that the entrance hole is formed in a plate-like member, provided independently from the camera main body and fixed on the camera main body, and the movable locking member is supported movably by the plate-like member. Moreover, it is preferable that the surface of the lock pin to be contacted with the tapered surface is cylindrical.

The present disclosure relates to the subject matter contained in Japanese patent application No. Hei. 10-332986 (filed on Nov. 24, 1999), which is expressly incorporated herein by reference in its entirety.

DESCRIPTION OF THE PREFERRED EMBODIMENT

Figure 1:
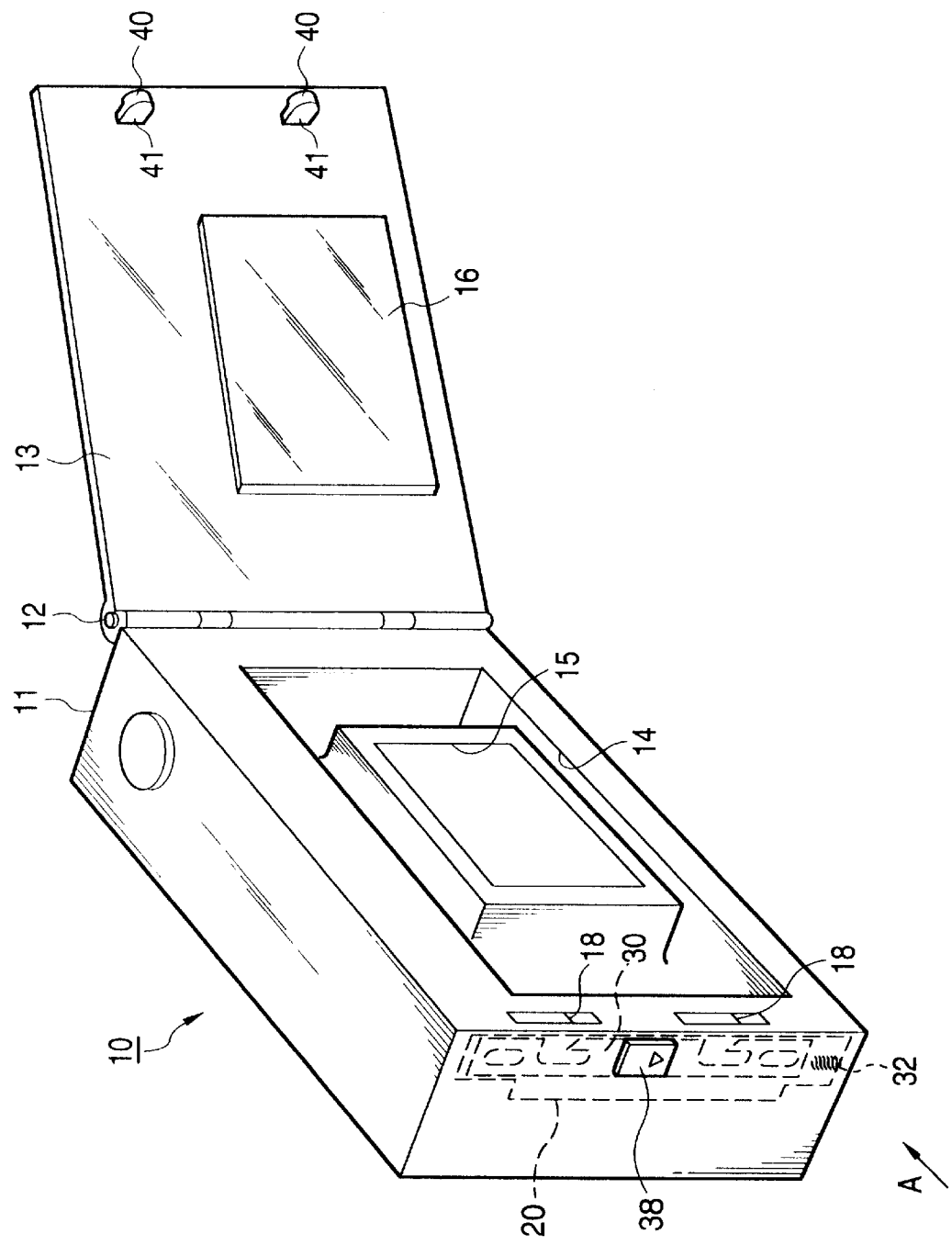
FIG. 1 is a perspective view of a camera with a locking mechanism for a backside cover according to the invention adopted, with the backside cover opened and viewed from the rear side.

Hereinafter, an embodiment of the invention will be explained with reference to the accompanied drawings. A camera 10 shown in FIG. 1 comprises a camera main body 11 and a backside cover 13 coupled by a hinge part 12 to the camera main body 11 to open or close the rear side of the camera main body 11. The rear side of the camera main body 11 has a rear side opening 14 through which a film (not illustrated) can be mounted when the backside cover 13 is opened. The closure of the backside cover 13 establishes a light shielding state inside the camera main body 11. An aperture 15 is formed behind a photographing optical system (not illustrated) in the rear side opening 14 so that each photographed frame of the film can be exposed at the position behind the aperture 15. A pressing plate 16 is provided on the backside cover 13 at a position facing to the aperture 15. The pressing plate 16 is for providing the flatness to the film behind the aperture 15, and thus a biasing member (not illustrated) is provided on the rear side of the pressing plate 16 so that the pressing plate 16 applies a constant depressing force to the film in the direction toward the camera main body 11 when the backside cover 13 is closed. That is, the pressing plate 16 biases the backside cover 13 to the opening direction when the backside cover 13 is closed.

A locking mechanism for the backside cover 13 is provided on the camera main body 11 and the backside cover 13 to lock the closure of the backside cover 13. The locking mechanism includes a main plate 20 fixed to the camera main body 11, a movable locking member 30 supported movably by the main plate 20, and a pair of lock pins 40 fixed in the vicinity of the tip of the backside cover 13 on the opposite side from the hinge part 12. The lock pins 40 are fixed via supporting parts 41 to the backside cover 13 to project therefrom. A pair of rear side holes 18 are provided on the rear side of the camera main body 11, through which the lock pins 40 can enter into the inside of the camera main body 11.

Figure 2:
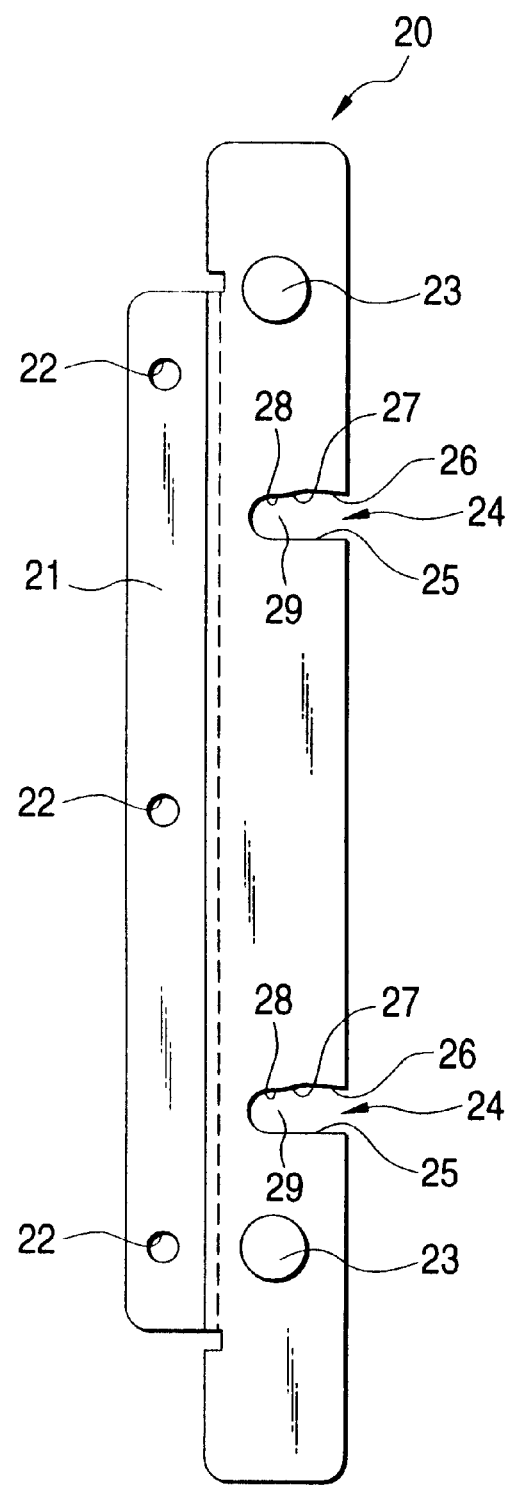
FIG. 2 is a diagram of a main leaf comprising the locking mechanism for the backside cover, viewed from the side of the camera.

FIG. 2 and subsequent figures shows the locking mechanism as viewed from the arrow A direction of FIG. 1. FIGS. 5 to 8 show the lock pin 40 without illustrating the supporting part 41. The lock pin 40 has a columnar shape with a D-shaped cross-section, having a planar retaining side surface 42 facing the backside cover 13, and a cylindrical side surface 43 continuous with the side surface 42. In FIG. 2 and subsequent figures, the lock pins 40 fixed in the vicinity of the tip of the backside cover 13 are displaced in the right and left direction in the figures when the backside cover 13 is opened or closed. The movement of the lock pins 40 to the right side corresponds to the backside cover opening direction, and the movement to the left side corresponds to the backside cover closing direction.

Figure 3:
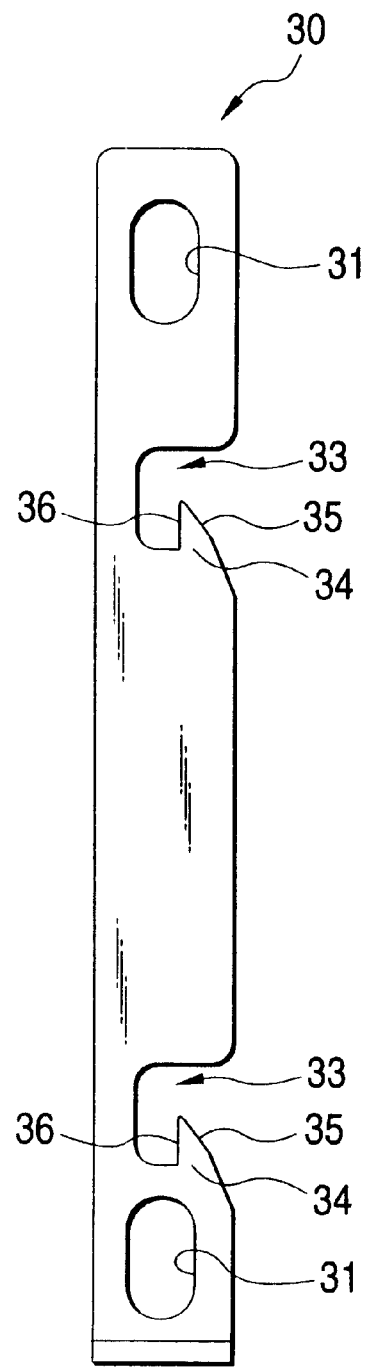
FIG. 3 is a diagram of a movable locking member comprising the locking mechanism for the backside cover, viewed from the side of the camera.

FIGS. 2 and 3 respectively show the main plate 20 and the movable locking member 30 in disassembled states, which are included in the locking mechanism. Three through holes 22 are formed in a side fixing part 21 of the main plate 20 so that the main plate 20 can be fixed to the inside of the camera main body 11 by fitting and screwing screws (not illustrated) into the through holes 22. A pair of cylindrical guiding projections 23 are provided to project from the surface of the main plate 20 toward the left side surface of the camera main body 11 when the main plate 20 is mounted on the camera main body 11. Furthermore, a pair of pin entrance holes 24, each in the form of a notch, are provided on the side part of the main plate 20 facing the rear side holes 18 to extend in the entrance direction of the lock pins 40 (right and left direction in the figures).

Each pin entrance hole 24 has an opening part having a width corresponding to the diameter of the lock pin 40. A pair of upper and lower opposing surfaces extend from the opening part toward the inner side (left side in the figure), of which the lower facing surface 25 is formed linearly. On the other hand, the upper facing surface comprises a first tapered surface 26 inclined gradually upward from the opening part to the inner side away from the lower facing surface 25, a second tapered surface 27 provided continuously with the first tapered surface 26, inclined in the opposite direction with respect to the first tapered surface 26, that is, gradually downward to the inner side, and a linear inner side supporting surface 28 substantially parallel with the lower facing surface 25 at the inner part with respect to the second tapered surface 27. The portion between the inner side supporting surface 28 and the lower facing surface 25 serves as a pin accommodating part 29, corresponding with the diameter of the lock pin 40. That is, the entrance hole 24 is wider than the diameter of the lock pin 40 in the part of the tapered surfaces 26, 27. In this camera 10, the hinge part 12 connecting the camera main body 11 and the backside cover 13a has a flexible part which permits displacement of the lock pin 40 by a slight amount in the width direction thereof (up and down direction in the figure) within the pin entrance hole 24. This locking mechanism is characterized by the pin entrance hole 24. Function of this characterizing part will be explained later.

A pair of guided long holes 31 to be fitted slidably with the guiding projections 23 provided on the main leaf 20 are formed on the movable locking member 30. By fitting the guiding projections 23 into the guided long holes 31, the movable locking member 30 is supported movably in the up and down direction of the camera (direction substantially orthogonal to the entrance direction of the lock pins 40 into the pin entrance holes 24). One end of a biasing spring 32 is connected with the lower end of the movable locking member 30, and the other end of the biasing spring 32 is fixed to the camera main body 11 side. The movable locking member 30 is movably biased upward by the biasing spring 32.

Furthermore, a pair of locking concave parts 33 are formed in the movable locking member 30 by notching the part facing with the rear side holes 18. A hook part 34, having a pressed surface 35 inclined toward the inner side such that the opening width of the locking concave part 33 becomes smaller toward the inner side, is formed toward the upper side in the vicinity of the opening of each locking concave part 33. The hook part 34 has a linear engaging surface 36 on the opposite side with respect to the pressed surface 35. The engaging surface 36 is formed parallel with respect to the moving direction of the movable locking member 30. The locking concave part 33 has the smallest opening width at the position where the tip portion of the hook part 34 is disposed, but the smallest width is sufficiently larger than the diameter of the lock pins 40 and the largest width of the pin entrance holes 24.

Figure 4:
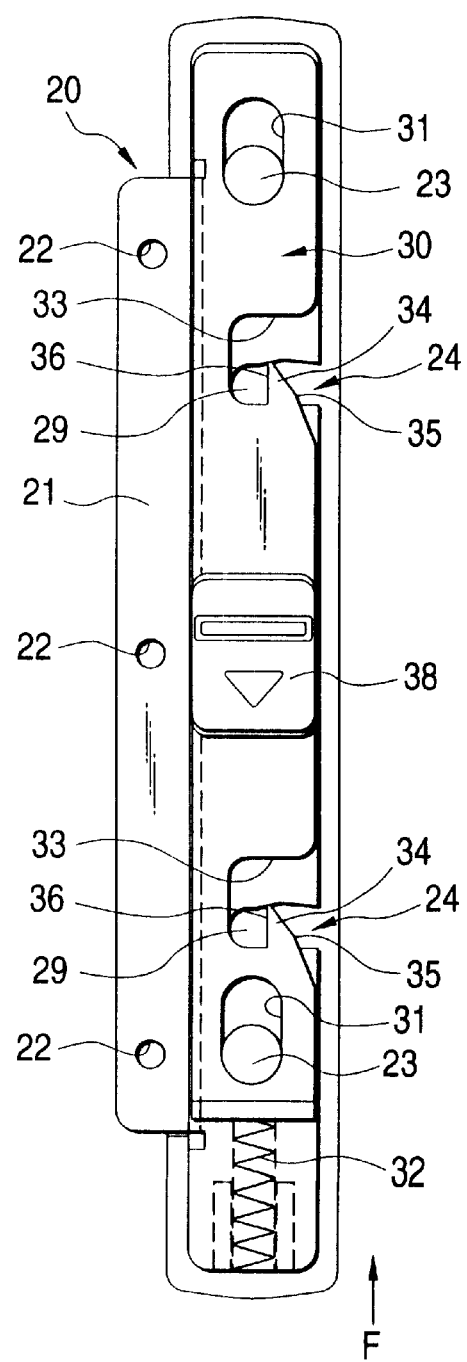
FIG. 4 is a diagram showing the main leaf and the movable locking member together.

FIG. 4 shows the state with the main plate 20 and the movable locking member 30 put together. In the figure, the movable locking member 30 is at a position biased upward by the biasing spring 32, with the further upward movement prohibited by the contact of the lower end of the pair of the guided long holes 31 with the pair of the guiding projections 23 of the main plate 20. When the movable locking member 30 is at this biased position, the hook part 34 is on the pin entrance hole 24 so that the part surrounded by the hook part 34, the engaging surface 36 and the pin accommodating part 29 is a closed area. In other words, it is the state where the hook part 34 closes the opening side of the pin accommodating part 29. Therefore, if the movable locking member 30 is at the force position of FIG. 4 with the lock pin 40 accommodated in the pin accommodating part 29, the movement to the right side of the lock pin 40 is prohibited by the engaging surface 36 of the hook part 34, and thus the backside cover 13 cannot be opened (see FIG. 5). That is, the biasing spring 32 biases the movable locking member 30 to the backside cover locking position. An operating member 38 is mounted on the movable locking member 30 for externally operating manually from the locking position (biased position) to the unlocking direction. The operating member 38 is exposed to the outside of the camera main body 11 (FIG. 1). When the movable locking member 30 is moved downward from the locking position by operating the operating member 38, since the hook part 34 withdraws from the position on the pin entrance hole 24 so that the lock pin 40 can be removed from the pin accommodating part 29 (pin entrance hole 24), the backside cover locking state is released.

Ordinary locking operation and lock releasing operation in the locking mechanism for the backside cover with the above-mentioned configuration will be explained specifically with reference to FIGS. 5 to 8. The arrow F shows the direction of biasing and moving the movable locking member 30 by the biasing spring 32. FIGS. 5 to 8 show only the lower one of the locking mechanism (hook part 34, lock pin 40).

Figure 5:
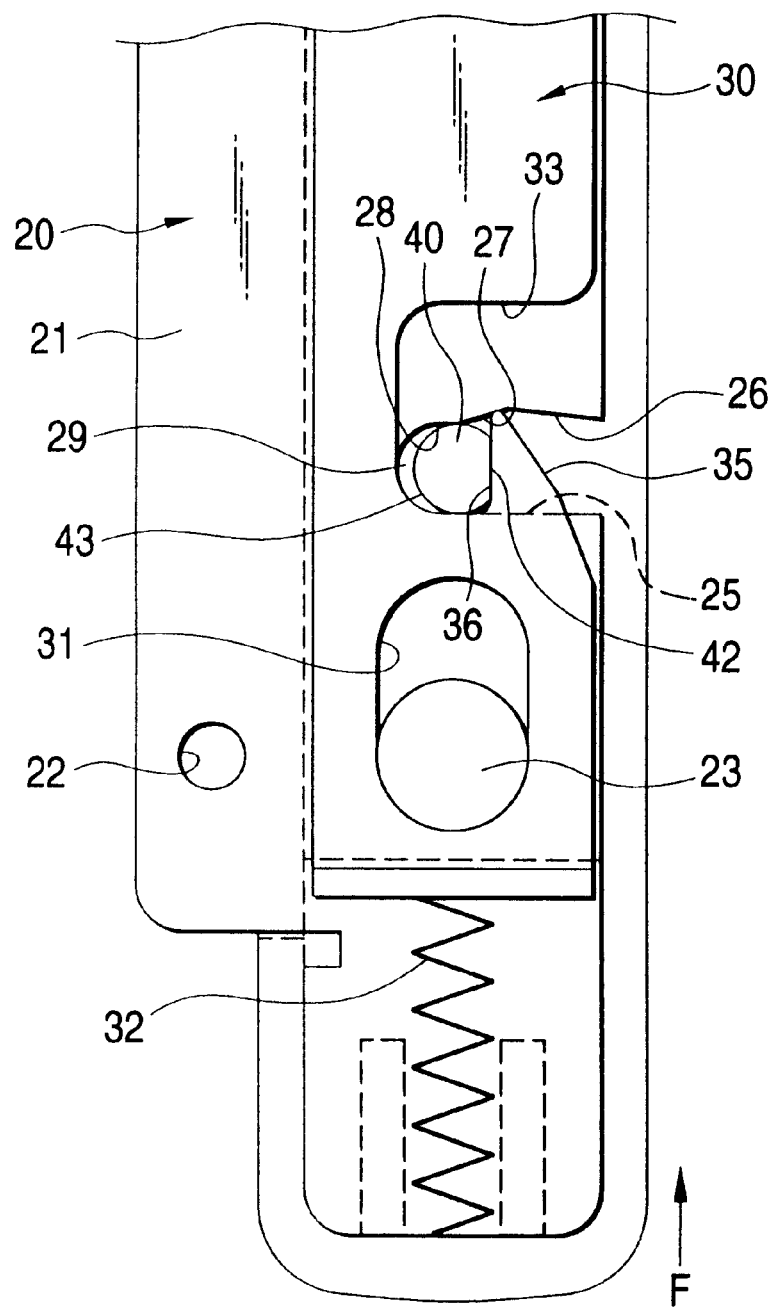
FIG. 5 is a diagram showing the principal part of the locking mechanism for the backside cover in the locked state.

When the backside cover 13 is closed, the locking mechanism is in the state shown in FIG. 5. The movable locking member 30 biased and moved to the arrow F direction by the biasing spring 32 is held at the backside cover locking position. The hook part 34 provided in the movable locking member 30 closes the opening side of the pin accommodating part 29. By the engaging relationship between the engaging surface 36 of the hook part 34 and the engaging surface 42 of the lock pin 40, the lock pin 40 held inside the pin accommodating part 29 cannot be detached to the outside of the pin entrance hole 24. That is, the opening operation to the right side of the backside cover 13 is prohibited. When the lock pin 40 is held in the pin accommodating part 29, the flexible portion of the hinge part 12 is not deflected.

In order to release the locking state of the backside cover 13, the operating member 38 is operated downward, resisting to the force of the biasing spring 32, that is, in the unlocking direction. According to the operation, a moving force from the locking position to the unlocking direction in FIG. 5 is applied on the movable locking member 30 so that the hook part 34 is withdrawn from the moving course of the lock pin 40. Since the smallest opening width of the locking concave part 33 is sufficiently large with respect to the width of the lock pin 40 as mentioned above, when the hook part 34 is withdrawn, the lock pin 40 can be detached outside the pin entrance hole 24 without being disturbed by the movable locking member 30.

With the lock releasing operation, the backside cover 13 can be opened. At the time, the backside cover 13 is slightly opened by the force on the pressing plate 16. Accordingly, return to the locking state when the user leaves his/her hand from the operating member 38 can be avoided. Other known techniques can be used for the structure for opening the backside cover simultaneously with the lock release. After opening the backside cover 13, the movable locking member 30 returns to the locking position by the force of the biasing spring 32.

Figure 6:
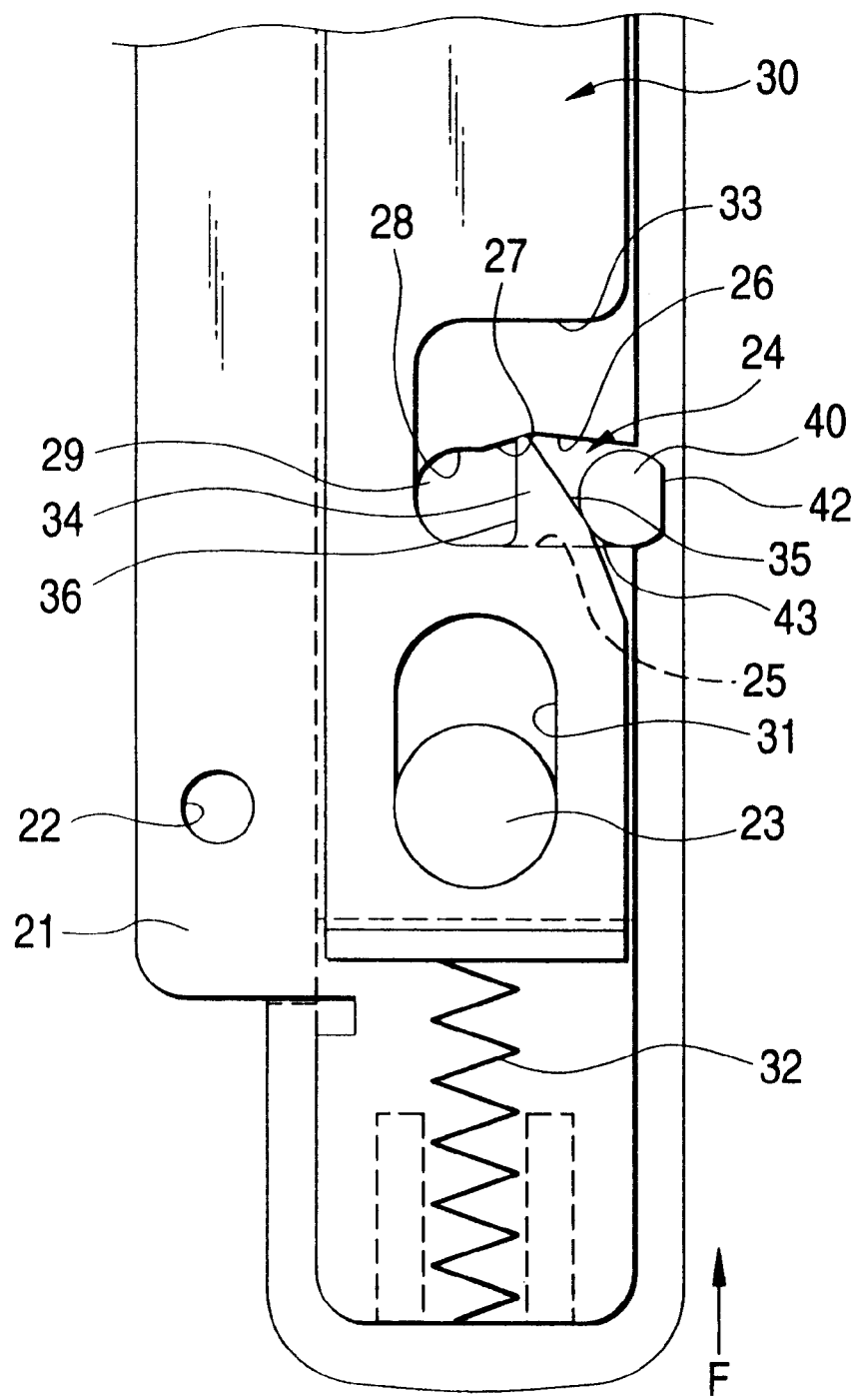
FIG. 6 is a diagram showing the principal part of the locking mechanism for the backside cover in the state of starting the closure of the backside cover.
Figure 7:
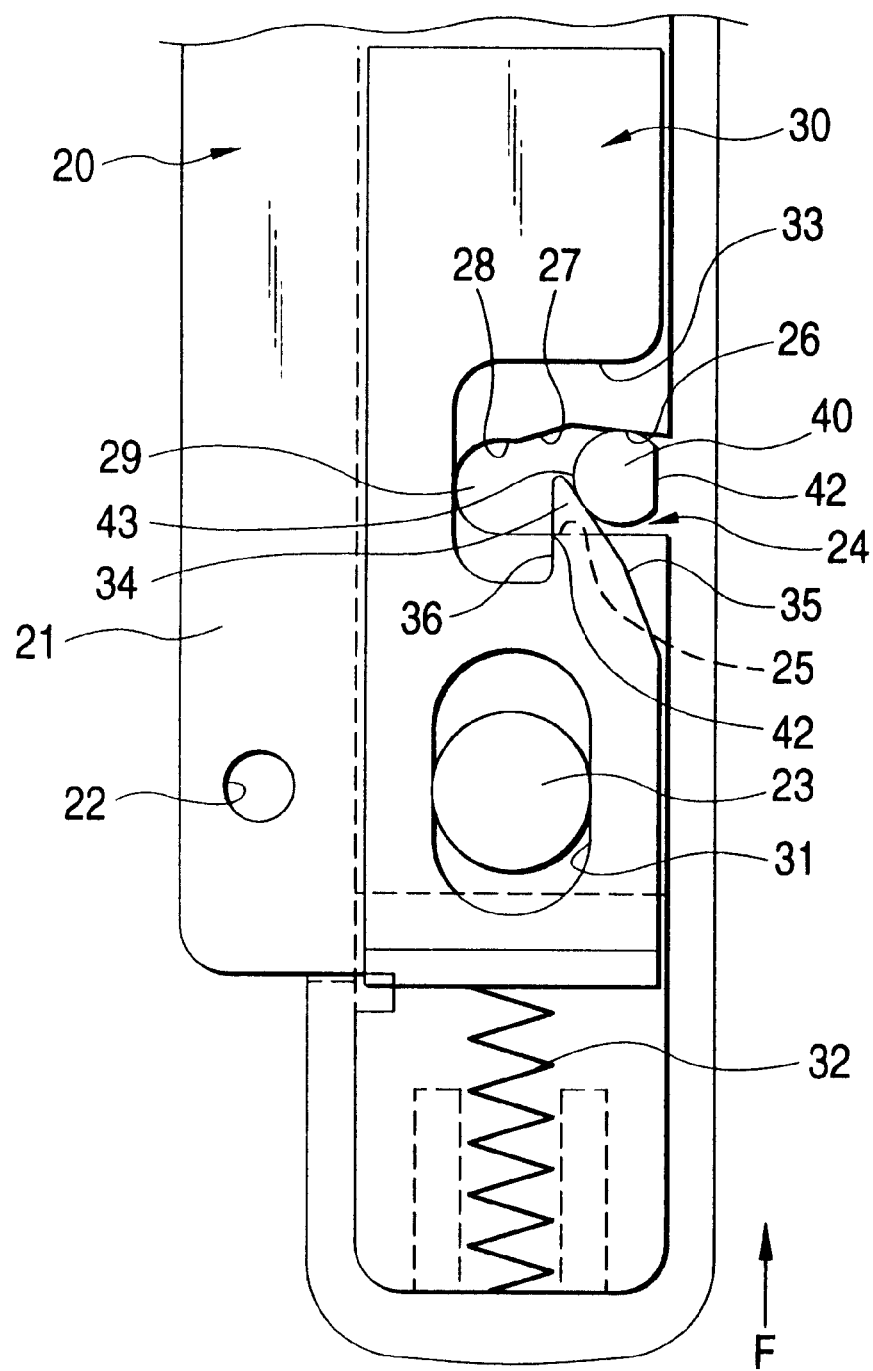
FIG. 7 is a diagram showing the principal part of the locking mechanism for the backside cover in the state of further closing the backside cover from FIG. 6.

In closing the backside cover 13, the cylindrical surface 43 of the lock pin 40 contacts with the pressed surface 35 of the hook part 34 at the time the lock pin 40 reaches to the opening part of the pin entrance hole 24 (FIG. 6). When the opening operation of the backside cover 13 is continued after the contact, according to the contacting relationship between the cylindrical surface 43 to be moved to the inner side (left side) of the pin entrance hole 24 and the pressed surface 35, a component force to move the movable locking member 30 downward is generated so that the movable locking member 30 is pressed downward, resisting to the biasing spring 32 (FIG. 7). As mentioned above, a flexibility sufficient for displacing the lock pin 40 in the width direction of the pin entrance hole 24 is provided in the hinge part 12 of the camera 10. Therefore, when the lock pin 40 enters into the pin entrance hole 24, as shown in FIG. 7, the lock pin 40 is pressed by the movable locking member 30 so as to move apart from the lower facing surface 25, while sliding on the upper side first tapered surface 26. At the time, the flexible portion of the hinge part 12 is slightly deflected by the displacement of the lock pin 40 upward in the figure.

Figure 8:
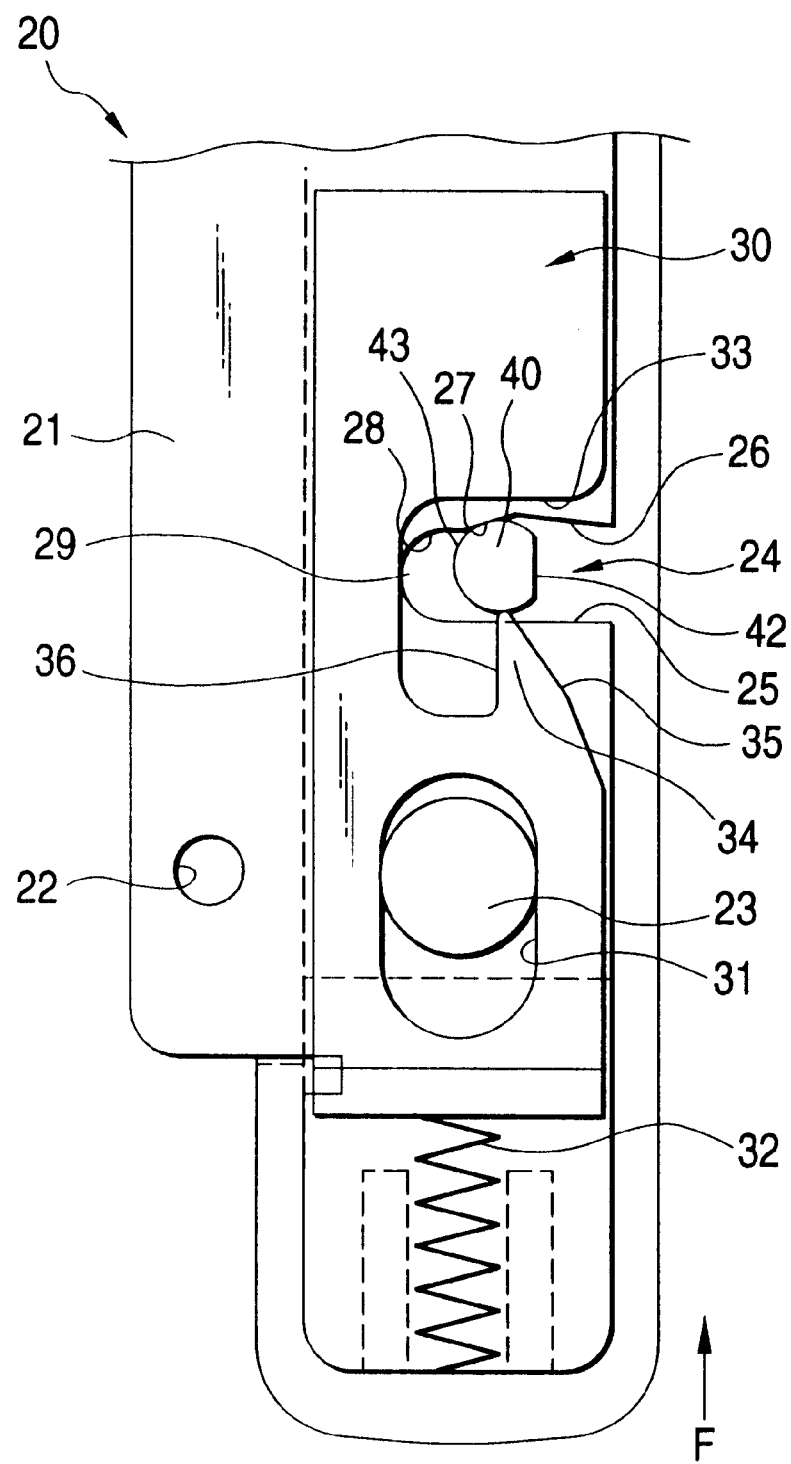
FIG. 8 is a diagram showing the principal part of the locking mechanism for the backside cover at the time the fixed locking member passes over the movable locking member.

When the opening operation of the backside cover 13 is continued and the lock pin 40 reaches to the position at which the cylindrical surface 43 contacts with the second tapered surface 27 while sliding, in the pin entrance hole 24, the cylindrical surface 43 moves over the pressed surface 35 so as to contact with the tip portion of the hook part 34 so that the movable locking member 30 is pressed downward mostly (FIG. 8). Accordingly, when the lock pin 40 is moved further inner side of the pin entrance hole 24, the lock pin 40 passes over the tip portion of the hook part 34 so as to be accommodated in the pin accommodating part 29. Since the downward pressure by the lock pin 40 is released, the movable locking member 30 is returned to the locking position of FIG. 5 by the biasing spring 32 so as to be in the backside cover locking state. Moreover, when the lock pin 40 is accommodated in the pin accommodating part 29, deflection of the flexible portion of the hinge part 12 is released accordingly.

Figure 9:
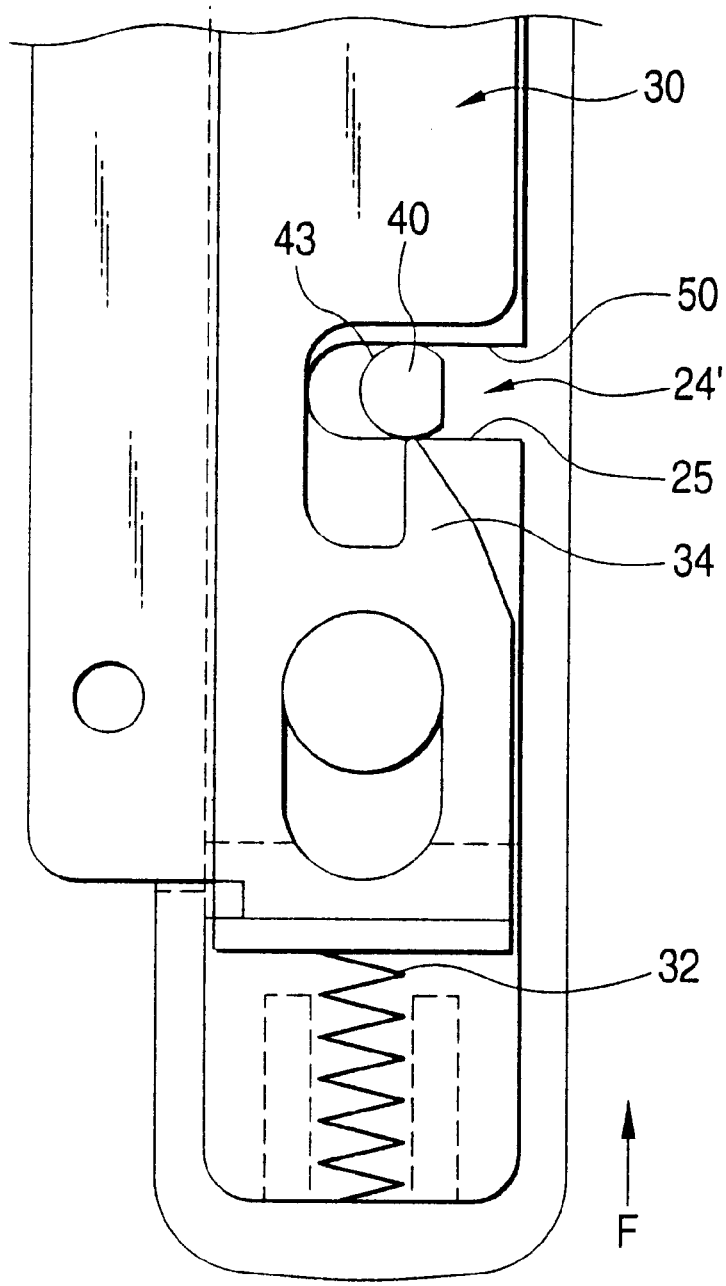
FIG. 9 is a diagram showing a comparative example with respect to a locking mechanism for a backside cover according to the invention.

Ordinary locking and lock releasing operations have been explained above. Before explaining the function characteristic of a locking mechanism for a backside cover according to the invention, a comparative example will be explained with reference to FIG. 9. The comparative example differs in that the upper side of a pin entrance hole 24' is formed as an linear upper facing surface 50 parallel with the lower facing surface 25. FIG. 9 shows the point at which the lock pin 40 passes over the tip of the hook part 34 as FIG. 8. The movable locking member 30 is pressed downward mostly, with the upward force by the biasing spring 32 applied on the movable locking member 30. According to the force, the lock pin 40 is pressed onto the upper facing surface 50.

In the case, for example, the closing operation of the backside cover is interrupted at the position of FIG. 9, or the force of closing the backside cover is so weak that the lock pin 40 is moved only to the position of FIG. 9, the lock pin 40 is sandwiched between the tip portion of the hook part 34 pressing upward from the lower side and the upper facing surface 50 of the pin entrance hole 24' so that it is held at the position in the figure by the force of the biasing spring 32 even when the user leaves his/her hand from the backside cover. This is the incomplete backside cover closing state, which looks as if it is closed, but the backside cover is not locked. If the camera is used in the state, there is a risk of inadvertent opening of the backside cover later on by the lock pin 40 removal from the sandwiched position. The inconvenience is caused due to the surface contacting with the pressed lock pin 40 being the upper facing surface 50 parallel with the moving direction of the lock pin 40.

On the other hand, since the tapered surface (second tapered surface 27) for generating the component force for moving the lock pin 40 subjected to the pressure of the movable locking member 30 to the opening direction (backside cover opening direction) is formed at the position at which the lock pin 40 may be sandwiched in the pin entrance hole 24 in the locking mechanism for the backside cover according to the invention, the inconvenience is not caused.

Specifically speaking, FIG. 8 shows the point at which the lock pin 40 passes over the hook part 34. At the time, one side of the lock pin 40 contacts with the second tapered surface 27. Since the second tapered surface 27 is inclined in the direction opening toward the opening side of the pin entrance hole 24, when the pressure is applied on the lock pin 40 by the movable locking member 30 from below in the figure, according to the contacting relationship between the second tapered surface 27 and the cylindrical surface 43, a component force to the right side, that is, in the direction biasing to the outside from the pin entrance hole 24 is applied on the lock pin 40. Therefore, in the case the force for closing the backside cover 13 is weak, or the closing operation of the backside cover 13 is interrupted halfway, the lock pin 40 cannot be sandwiched and held between the hook part 34 and the second tapered surface 27 at the position shown in FIG. 8, but the lock pin 40 is forced out to the opening direction of the pin entrance hole 24 along the second tapered surface 27 by the force of the biasing spring 32 applied via the movable locking member 30. Then, the lock pin 40 is moved to the pressed surface 35 side of the hook part 34. Since the pressed surface 35 has a small inclination with respect to the moving direction of the movable locking member 30, the lock pin 40 is moved out to the opening part of the pin entrance hole 24 as shown in FIG. 6 without being sandwiched by the movement of the movable locking member 30 in the force direction. When the lock pin 40 is forced out to the opening part of the pin entrance hole 24, the backside cover 13 is already in the slightly opened state. Since the operation hereto is generated by the force of the biasing spring 32 for biasing the movable locking member 30, a special operation is not required. After the lock pin 40 forced out to the opening direction by the function of the second tapered surface 27, a force of biasing means in the backside cover opening direction, such as the pressing plate 16 can be utilized until the lock pin 40 is detached form the pin entrance hole 24.

The first tapered surface 26 has the following function. In the state of FIG. 8, the lock pin 40 is contacted with the second tapered surface 27 by the deflection of the flexible portion of the hinge part 12. When the lock pin 40 is forced out from this position to the opening direction of the pin entrance hole 24, the lock pin 40 is moved along the first tapered surface 26. Since the first tapered surface 26 has an inclination for guiding the lock pin 40 in the direction of releasing the deflection of the flexible portion of the hinge part 12, that is, downward in the figure, the deflection of the flexible portion of the hinge part 12 is released gradually as the lock pin 40 moves along the first tapered surface 26. In the state of FIG. 6, where the lock pin 40 reached to the opening of the pin entrance hole 24, since the position of the lock pin 40 in the width direction of the pin entrance hole 24 is the same as the state accommodated in the pin accommodating part 29, the deflection at the hinge part 12 is eliminated. If the upper facing surface of the pin entrance hole 24 is not the first tapered surface 26 but a surface parallel with the lower facing surface 25, the deflection on the hinge part 12 cannot be eliminated immediately before the lock pin 40 is detached from the pin entrance hole 24 so that a large burden is applied on the hinge part 12. That is, the first tapered surface 26 has the function for minimizing the deflected state of the flexible portion of the hinge part 12 via the lock pin 40 so as to alleviate the burden on the hinge part 12.

As apparent from the explanation heretofore provided, according to the locking mechanism for the backside cover, since the backside cover 13 is always opened unless the lock pin 40 is entered to the complete locking position (in the pin accommodating part 29), the incomplete closing state of the backside cover cannot be generated. Although the lock pin 40 can be displaced in the width direction of the pin entrance hole 24 by the deflection of the hinge part 12 in this embodiment, it is also possible to preliminarily set the tolerance for allowing the displacement of the lock pin 40 in the hinge part 12.

What is claimed is:

1. A locking mechanism for a backside cover that opens or closes a back side of a camera main body, the locking mechanism comprising:

a lock pin provided on one of the camera main body and the backside cover;

a movable locking member supported by the other of the camera main body and the backside cover, the movable locking member being operable from an outside of the camera main body and movable between a locking position in which a hook part of the movable locking member is engaged with the lock pin in a state where the backside cover closes the back side of the camera main body, and an unlocking position in which the hook part is disengaged from the lock pin;

a biasing mechanism which biases the movable locking member toward the locking position;

an entrance hole provided on the one of the camera main body or the backside cover where the movable locking member is provided, the entrance hole allowing the lock pin to enter into an engagement position in which an engaging surface of the lock pin is engaged with an engaging surface of the hook part when the backside cover closes the back side of the camera main body; and a tapered surface provided in the entrance hole, wherein when the lock pin does not enter into the engagement position and is pressed in a biasing direction by the movable locking member, the tapered surface contacts the lock pin and guides the lock pin externally from the entrance hole using a pressing force of the movable locking member in cooperation with the tapered surface.

2. The locking mechanism according to claim 1, wherein the entrance hole is formed in a discrete plate-like member fixed to the camera main body, the plate-like member movably supporting the movable locking member.

3. The locking mechanism for a backside cover according to claim 1, wherein a surface of the lock pin to be contacted with the tapered surface is cylindrical.

4. The locking mechanism for a backside cover according to claim 1, wherein the entrance hole includes an opening part, and said tapered surface includes a first tapered surface located adjacent to the opening part and gradually inclined from the opening part to increase a width of the entrance hole, and a second tapered surface provided continuously with the first tapered surface and gradually inclined from the first tapered surface to decrease the width of the entrance hole.

5. The locking mechanism for a backside cover according to claim 1, wherein the entrance hole includes an opening part, and an upper curved surface and a lower linear surface extending from the opening part to confront with each other, and the tapered surface includes a first tapered surface inclined gradually upward from the opening part toward an inner side of the entrance hole away from the lower linear surface, and a second tapered surface provided continuously with the first tapered surface and inclined gradually downward toward the inner side of the entrance hole, the first and second tapered surfaces forming the upper curved surface.

6. A locking mechanism for a backside cover that opens or closes a back side of a camera main body, the locking mechanism comprising:

a lock pin provided on one of the camera main body and the backside cover;

a movable locking member supported by the other of the camera main body and the backside cover, the movable locking member being operable from an outside of the camera main body and movable between a locking position in which a hook part of the movable locking member is engaged with the lock pin in a state where the backside cover closes the back side of the camera main body, and an unlocking position in which the hook part is disengaged from the lock pin;

a biasing mechanism which biases the movable locking member toward the locking position;

an entrance hole formed on the one of the camera main body or the backside cover where the movable locking member is provided, the entrance hole allowing the lock pin to enter into an engagement position in which the lock pin is engaged with the hook part when the backside cover closes the back side of the camera main body, wherein the entrance hole includes:

an opening part;

an upper surface extending from the opening part, a lower surface extending from the opening part and confronting the upper surface, the upper surface including a first tapered surface that is inclined to gradually decrease a distance between the upper and lower surfaces as the upper and lower surfaces reach farther from the opening part, and wherein the first tapered surface cooperates with a biasing force of the movable locking member to guide the lock pin externally from the entrance hole.

7. The locking mechanism for a backside cover according to claim 6, wherein the upper surface further includes a second tapered surface that is located between the first tapered surface and the opening part, and that is inclined to gradually increase the distance between the upper and lower surfaces as the upper and lower surfaces reach farther from the opening part.

\* \* \* \* \*